(12) United States Patent
Weh et al.

(10) Patent No.: US 6,676,108 B1
(45) Date of Patent: Jan. 13, 2004

(54) CONTROL VALVE

(76) Inventors: Erwin Weh, Siemensstrasse 5, 89257 Illertissen (DE); Wolfgang Weh, Siemensstrasse 5, 89257 Illertissen (DE)

( * ) Notice: Subject to any disclaimer, the term of this patent is extended or adjusted under 35 U.S.C. 154(b) by 0 days.

(21) Appl. No.: 09/485,357

(22) PCT Filed: Aug. 4, 1998

(86) PCT No.: PCT/EP98/04858

§ 371 (c)(1),
(2), (4) Date: Apr. 27, 2000

(87) PCT Pub. No.: WO99/08031

PCT Pub. Date: Feb. 18, 1999

(30) Foreign Application Priority Data

Aug. 4, 1997 (DE) ...................... 297 13 878 U

(51) Int. Cl.[7] .............................................. F16K 39/00
(52) U.S. Cl. ...................... 251/282; 251/322; 251/332; 251/900
(58) Field of Search ................................. 251/282, 900, 251/321, 322, 323, 332, 357, 360, 361

(56) References Cited

U.S. PATENT DOCUMENTS

| | | | | |
|---|---|---|---|---|
| 2,516,996 A | * | 8/1950 | Jensen ...................... 251/282 X |
| 2,638,108 A | * | 5/1953 | Williams et al. ............ 251/323 |
| 2,897,836 A | * | 8/1959 | Peters et al. ............. 251/282 X |
| 3,091,254 A | * | 5/1963 | Kilayko ..................... 251/332 |
| 3,145,010 A | * | 8/1964 | Karr, Jr. .................... 251/361 |
| 3,148,700 A | * | 9/1964 | Friedell ..................... 251/322 |
| 3,529,622 A | * | 9/1970 | Weise et al. ................ 251/332 |
| 3,567,175 A | * | 3/1971 | Sciuto, Jr. ................. 251/149.6 |
| 3,627,257 A | * | 12/1971 | Stampfil .................. 251/282 X |
| 3,675,896 A | * | 7/1972 | Mercier ..................... 251/321 |
| 4,136,851 A | * | 1/1979 | Hansen et al. ............. 251/282 |
| 4,341,370 A | * | 7/1982 | Banks ....................... 251/282 |
| 4,364,408 A | * | 12/1982 | Griswold et al. ........ 251/282 X |
| 4,582,294 A | * | 4/1986 | Fargo ..................... 251/282 X |
| 4,655,253 A | * | 4/1987 | Ourensma .................. 251/282 |
| 5,190,074 A | * | 3/1993 | Christopher ............. 251/900 X |
| 5,381,818 A | * | 1/1995 | Nendzig et al. ............ 251/321 |
| 5,386,965 A | * | 2/1995 | Marchal .................... 251/282 |
| 5,525,047 A | * | 6/1996 | Sternenberg et al. ... 251/282 X |
| 5,540,412 A | * | 7/1996 | Doll ....................... 251/282 X |
| 5,769,123 A | * | 6/1998 | Heestand et al. ....... 251/282 X |

FOREIGN PATENT DOCUMENTS

| | | | | |
|---|---|---|---|---|
| DE | 2113602 | * | 9/1972 | ................. 251/282 |
| DE | 3910765 A1 | * | 10/1990 | ................. 251/282 |
| FR | 2230907 | * | 12/1974 | ................. 251/282 |
| GB | 2017266 A | * | 10/1979 | ................. 251/282 |

* cited by examiner

*Primary Examiner*—John Bastianelli
(74) *Attorney, Agent, or Firm*—Knobbe Martens Olson & Bear LLP

(57) ABSTRACT

A control valve includes a valve body and a valve seat mounted within the valve body. A valve element is mounted in the valve body and bears in a closed position on the valve seat to block a fluid passage formed in the valve body. An actuating rod is configured for axial movement and acts upon the valve element to move the valve element into an open position. At least one of the actuating rod and the valve element has an annular piston surface and is in communication with a fluid passage through an equalizing line.

10 Claims, 3 Drawing Sheets

CONTROL VALVE

FIELD OF THE INVENTION

This invention relates to a control valve with valve element which is mounted in a valve body and bears in the closed position on a valve seat, to block a fluid passage formed in the valve body, and can be moved into an open position by axial movement of an actuating rod.

BACKGROUND OF THE INVENTION

Such a control valve is known from FR-A 1 378 578 for example. The control valve employed there serves in particular for turning spray systems on and off. The closed position is attained by actuating a hand lever, which acts on an actuating rod (plunger), at the front end of which is arranged a conical valve element. The valve element is biased on to the valve seat by at least one compression spring, to block the fluid passage. In order to achieve a high closing force of the valve in this closed position, relatively strong compression springs are usually employed, which however require relatively high actuating forces for switching the control valve into the open or free-passage position. Accordingly a multi-part actuating lever is proposed in the cited reference, with an appropriate mechanical advantage, but the construction is very expensive. In addition this normal construction with a plurality of transmission levers is prone to wear, especially with frequent switching operations. Moreover the structural volume of such a control valve is increased in a disadvantageous manner.

SUMMARY OF THE INVENTION

In consequence the invention is based on the object of avoiding the above disadvantages and providing a control valve which has a high closing force with a small actuating force, as well as facilitating a simple and compact construction.

One aspect of the invention involves a control valve having a valve body and a valve seat mounted within the valve body. A valve element is mounted in the valve body and bears in a closed position on the valve seat to block a fluid passage formed in the valve body. An actuating rod is configured for axial movement and acts upon the valve element to move the valve element into an open position. At least one of the actuating rod and the valve element has an annular piston surface and is in communication with a fluid passage through an equalizing line.

The formation of an annular piston surface on the actuating rod and of an equalizing line, which is in communication with the fluid passage, leads to the result that pressure occurring in the fluid line is passed to the rear side of the valve element and there increases the closing force of the valve element by acting on the annular piston surface. A "balancing out" matched to the currently applied pressure is thus obtained. It should be noted that the annular piston surface has a larger effective piston area than in comparison with area of the sealing surface of the valve element, so that the valve element is always biased in the direction of the closed position.

This makes it possible in preferred manner to use a relatively weak compressing spring, since the required closing force is achieved in particular by the action of the fluid on the annular piston surface. Accordingly even a relatively short hand lever can be used to operate the control valve, or a correspondingly compact spindle or eccentric drive or pneumatic cylinder. A particularly compact overall construction results from this.

In an advantageous embodiment the piston area is formed in one piece with the actuating rod for the valve element, namely as a simple turned part, on which an annular shoulder is formed as the piston surface. In addition this annular piston surface can be formed as an abutment surface for the compression spring.

In a particularly simple construction the equalizing line is passed centrally through the actuating rod, for example in the form of a central bore and a transverse channel bore joining this. A particularly simple manufacture results from this. However the equalizing line can also be formed outside, in the valve body or eccentrically in the actuating rod, especially if a central fluid passage is desired.

BRIEF DESCRIPTION OF THE DRAWINGS

Several embodiments of the control valve are described and explained below with reference to the drawings, in which.

DETAILED DESCRIPTION OF THE INVENTION

Figure 1:
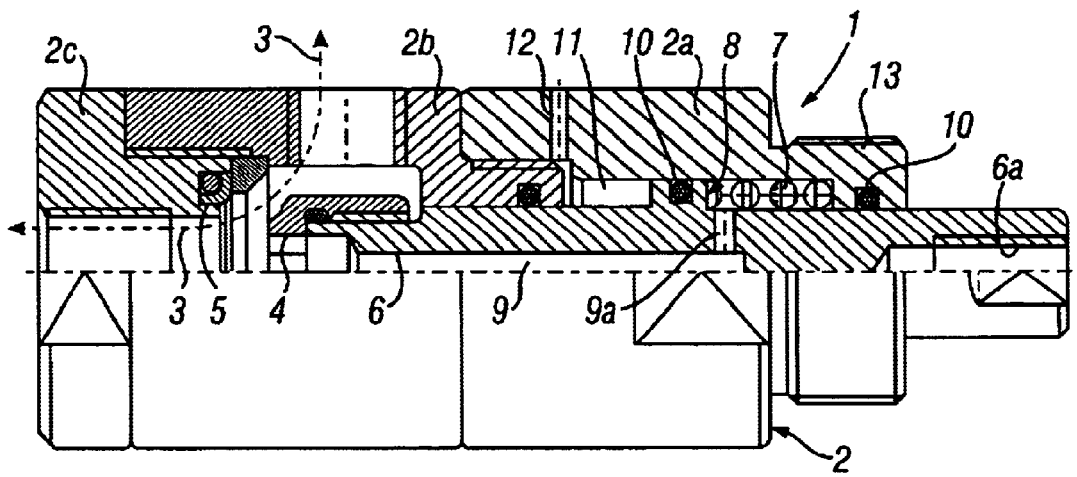
FIG. 1 shows a control valve in the open position.

A control valve 1 is shown in the open position in FIG. 1, wherein a valve element 4 is spaced from a valve seat 5 in the substantially cylindrical valve body 2, so that a fluid passage indicated in broken lines is enabled. The valve body 2 is constructed of three individual parts 2a, 2b and 2c, screwed together in a cylindrical unit. The fluid inlet is formed in the central valve body part 2b while the fluid outlet is provided in the valve body part 2c. The arrangement can however be reversed, as is indicated by the double arrow. The valve seat 5 is further formed in the valve body part 2c by fitting a suitable seal. This construction with a screw connection between the valve body parts 2b and 2c has the advantage that the valve seat 5 can be exchanged quickly in the case of servicing. Likewise different connections, here in the form of an internal thread, can be provided.

The valve element 4 of sleeve form is here screwed on the tip of an actuating rod 6, so that the valve element 4 can also be exchanged quickly and can also be formed of a material more resistant to wear than the actuating rod 6. The valve element 4 can however also be made in one piece with the actuating rod 6 or be soldered or welded or press fitted to this.

The actuating rod 6 is guided at one end in the middle valve body part 2b and at the other end in a valve body part 2a at the actuating end. The actuating rod 6 is preferably biased by a compression spring 7 in the direction of the closed position, i.e. abutment of the valve element 4 on the valve seat 5. The compression spring 7 engages on the valve body part 2a at one end and at the other end on an annular flange which also forms a piston surface 8. The piston surface 8 is subject to fluid through an equalizing line 9 forming the novelty. One or more transverse bores 9a in the actuating rod 6 area also components of the equalizing line 9.

Figure 2:
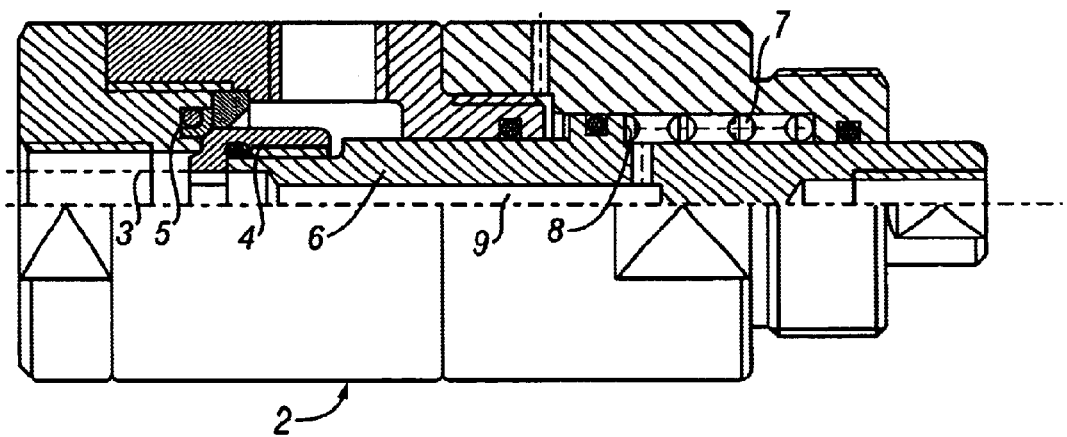
FIG. 2 shows the control valve according to FIG. 1 in the closed position.

The closed position of the control valve 1 is shown in FIG. 2. Thus, if pressure is still present in the region of the valve body part 2c, the space in which the compression spring 7 is located and thus the piston surface 8 are affected via the equalizing line 9, so that the actuating rod 6 is pressed more strongly in the direction of the valve seat 5. The closing force in the closed position is enhanced by this. The pressure chamber thus formed, in which the compression spring 7 is located, is sealed relative to the outside by several seals 10.

An equalising chamber 11 is also provided between the valve body parts 2a and 2b, to facilitate the axial movement of the actuating rod 6. This equalizing chamber 11 is provided here with a vent bore 12 in the valve body 2, so that no pressure can build up, which could affect the axial movement of the actuating rod 6. This annular space 11 can however also be subject to pressure in order to facilitate or assist the axial movement into the open position, in that a switchable pressure line is connected to the bore 12 for example. Furthermore a thread 13 (or similar fixing element) is provided on the end of the valve body part 2a at the actuation end, to which a switching element 20 or 30 can be attached in conjunction with a thread 6a on the actuating rod 6, as is described below.

Figure 3:
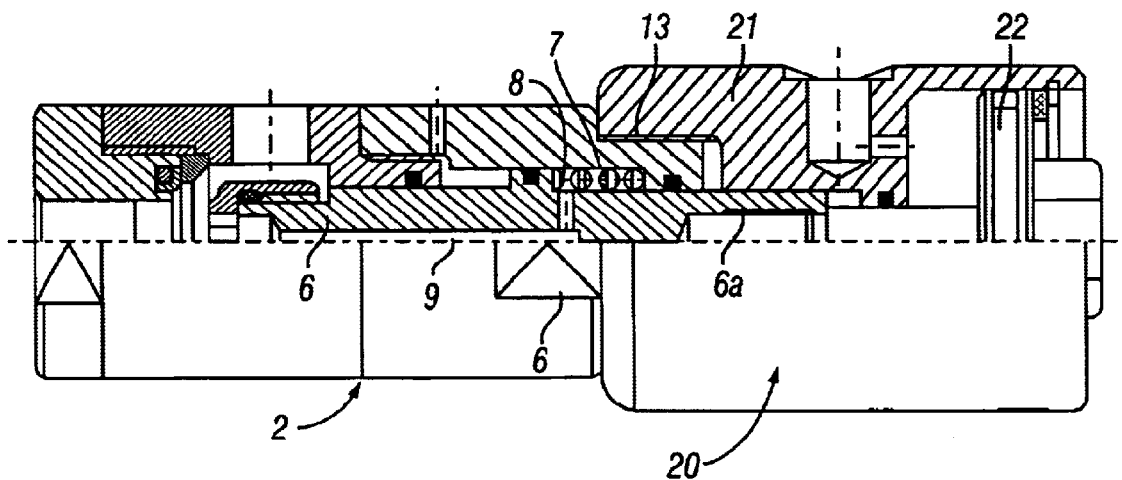
FIG. 3 shows the control valve according to FIGS. 1 and 2 with a pneumatic actuator.

In FIG. 3 a pneumatic cylinder 20 is attached to the valve body 2, namely with an outer part 21 on the thread 13 and a piston part 22 on the thread 6a of the actuating rod 6. On feeding compressed air (or equally oil under pressure in an implementation as a hydraulic cylinder), the piston part 22 is displaced to the right, so that the control valve 1 assumes the open position according to FIG. 1. On relieving the pressure the pressure part 22 is formed to the left into the closed position according to FIG. 2, by the compression spring 7, through the coupling to the actuating rod 6. The simple ability to attach the pneumatic cylinder 20 and the compact construction are especially noteworthy.

Figure 4:
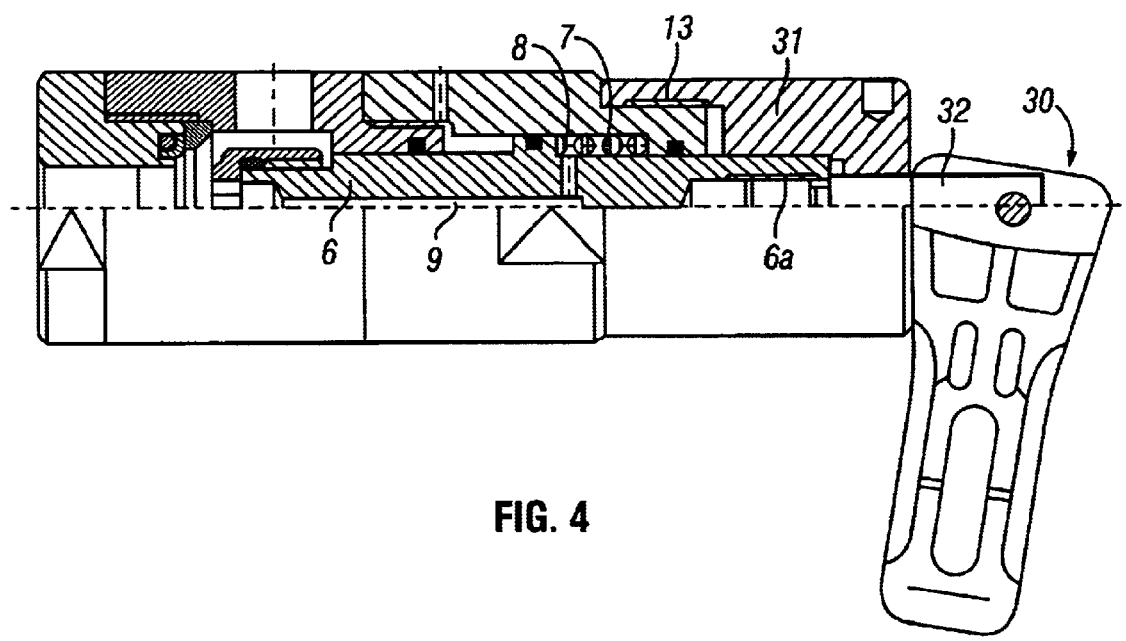
FIG. 4 shows a design with hand lever actuation of the control valve.

A further embodiment of a switching device is shown in FIG. 4, in the form of a hand lever 30. The attachment to the valve body 2 is again effected by means of the thread 13, on to which a support sleeve 31 can be screwed. The hand lever 30 is mounted on a lever rod 32, which is screwed into the thread 6a of the actuating rod 6. The hand lever 30 can however also be fixed without interposition of the support sleeve 31. Likewise, on account of the "pressure balanced" design and the small actuating force achieved by this, a handle can be provided for shifting the actuating rod 6. In the implementation as a shut-off valve, e.g. for a gas cylinder, the actuating rod 6 can also be formed as a spindle, which can be rotated by means of a handwheel (instead of the hand lever 20) and thus be moved into the closed or open position.

A particularly simple coupling up and a compact construction thus result. Instead of the switching device in the form of a pneumatic cylinder 20 or a hand lever 30 shown here, an eccentric lever engaging the actuating rod 6 (e.g. according to EP-A 0 340 879) or a hydraulic cylinder could naturally be used, although hydraulic actuation is basically unnecessary, on account of the small actuation force of the control valve 1. Nevertheless, this kind of actuation can be advantageous, especially when hydraulic oil is fed through the fluid passage 3, so that this medium can then be utilized in a simple way for switching the control valve 1. In addition, a venting valve (similar to the venting bore 12 in FIG. 1) or at least one further valve can be actuated in sequential switching with little delay by means of the actuating rod 6, at the same time as the valve element 4 is closed. Thus a push rod 50 can be fitted in the equalizing line 9 for example, this being shown in FIG. 6 in broken lines.

Figure 5:
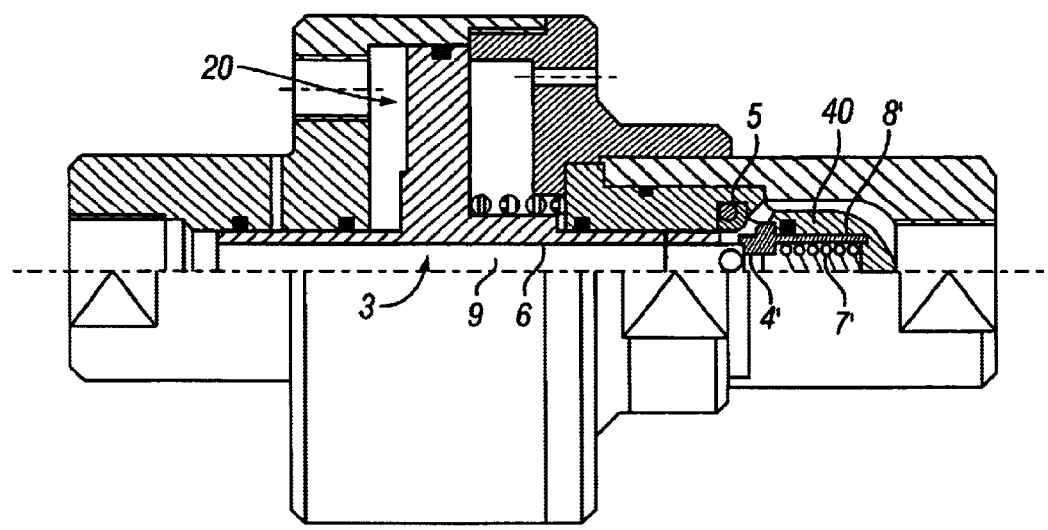
FIG. 5 shows a modified design of the control valve in the open position.
Figure 6:
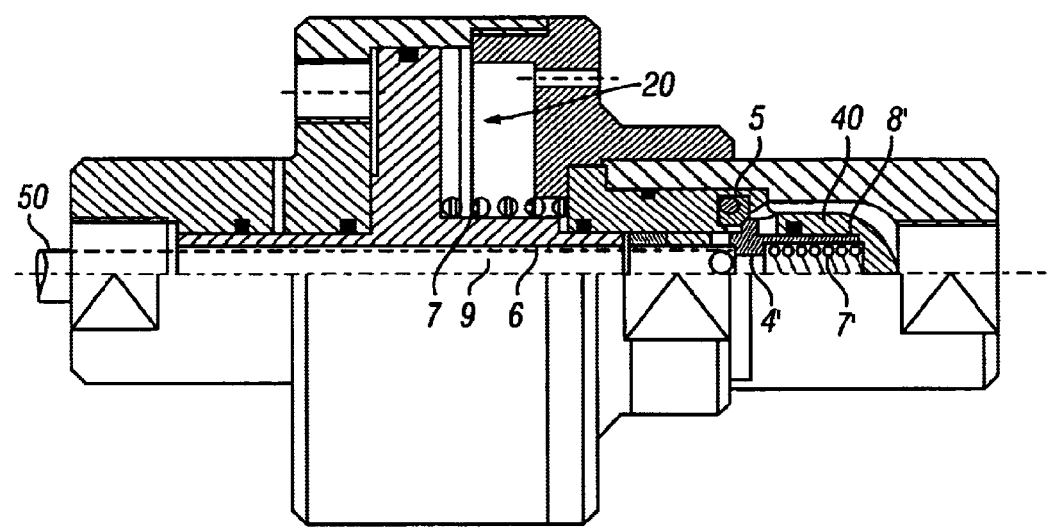
FIG. 6 shows the design according to FIG. 5 in the closed position.

A modified embodiment of the control valve 1 with pneumatic actuation is shown in FIGS. 5 and 6, wherein the open or flow position is shown in FIG. 5 and the closed position in FIG. 6. In distinction from FIGS. 1 to 4, the actuation of the valve element 4' is effected from the opposite end of the fluid passage 3, namely from the left, outlet end in this case. Because of this modification the reference number for the valve element 4 is given a prime. The same applies for the further elements which are basically referenced with the same reference numerals as in FIGS. 1 to 4 and only distinguished by a prime when there is a difference. Thus the actuating rod 6 forces the valve element 4' into the open position under the action of a pneumatic cylinder 20 (as in FIG. 3), and release the valve element 4' in the un-pressurised state of the pneumatic cylinder 20, so that the valve element 4' is forced on to the valve seat 5 by a separate spring 7' (also with release of the actuating rod 6 under assistance from the spring 7).

The valve element 4' is mounted in a flow-round body 40, so that uniform flow around this results in the through-flow position. An annular piston face 8' is again formed on the rear side of the valve element 4' and is in communication with the fluid passage 3 on the outlet side through the equalizing line running inside the actuating rod 6. Accordingly the pressure occurring in the fluid passage 3 is also diverted here to the rear side of the valve element 4' and there increases the force of application and closing of the valve element 4' through the action on the annular piston surface 8'. The flow direction can naturally also be reversed. On closure of the valve element 4' the push rod 50 fitted centrally with play is also shifted axially, so that a venting valve or other valve can thereby also be actuated.

What is claimed is:

1. A control valve, comprising:

a valve body formed from a plurality of valve body parts which are screwed into one another;

a valve seat within the valve body and comprising a seal fitted within at least one of the valve body parts so that the seal is configured to be clamped between the valve body parts, wherein the valve seat formed as a combined O-ring and PTFE ring;

a valve element mounted in the valve body and bearing axially in a closed position on the valve seat to block a fluid passage formed in the valve body; and an actuating rod configured for axial movement and acting upon the valve element to move the valve element into an open position, wherein at least one of the actuating rod and the valve element has an annular piston surface with a greater effective pressure area than a sealing surface on the valve element/valve seat and is in communication with a fluid passage through an equalizing line.

2. The control valve according to claim 1, wherein the piston surface is formed in one piece with the actuating rod.

3. The control valve according to claim 1, wherein the piston surface is formed as an abutment surface for a compression spring.

4. The control valve according to claim 1, wherein the equalizing line runs centrally in the actuating rod and is led to the piston surface through at least one transverse channel.

5. The control valve according to claim 1, wherein the actuating rod is of tubular form, so as to form a central fluid passage, the equalizing line being passed by outside.

6. The control valve according to claim 1, wherein the actuating rod can be actuated by a hand lever or designed as a spindle of a handwheel.

7. The control valve according to claim 1, wherein the actuating rod can be operated from a pneumatic cylinder or an eccentric lever.

8. The control valve according to claim 1, wherein the piston surface is sealed relative to the valve body by at least one seal.

9. The control valve according to claim 1, wherein the valve element can be screwed on to the actuating rod.

10. The control valve according to claim 1, wherein a thread is provided on an end of the valve body part at an operating end for fixing a switching device.

* * * * *